US012620281B2

(12) United States Patent
Sadhasivam et al.

(10) Patent No.: US 12,620,281 B2
(45) Date of Patent: May 5, 2026

(54) BUILDING ACCESS USING A MOBILE DEVICE

(71) Applicant: Honeywell International Inc., Charlotte, NC (US)

(72) Inventors: Prithivirajan Sadhasivam, Tamil Nadu (IN); Sivakumar Nagarajan, Tamil Nadu (IN); Santhakumar P, Tamil Nadu (IN); Manonmani Chandrasekaran, Tamil Nadu (IN); S.B.Saravana Pandiyan, Tamil Nadu (IN); Thiruppathi V, Tamil Nadu (IN); Vikramraj Sivaram, Tamil Nadu (IN); Shiva Sankar G P, Tamil Nadu (IN); Hayes C Whitt, Decatur, GA (US); Muthu Kannan Muthuvel, Tamil Nadu (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 133 days.

(21) Appl. No.: 18/466,628

(22) Filed: Sep. 13, 2023

(65) Prior Publication Data

US 2025/0087036 A1 Mar. 13, 2025

(51) Int. Cl.
*G07C 9/00* (2020.01)
*H04W 4/02* (2018.01)
*H04W 8/20* (2009.01)

(52) U.S. Cl.
CPC ........ *G07C 9/00174* (2013.01); *H04W 4/023* (2013.01); *H04W 8/205* (2013.01);
(Continued)

(58) Field of Classification Search
CPC ...... G07C 9/00174; G07C 2009/00769; G07C 2209/63; G07C 9/00309; G07C 9/29;
(Continued)

(56) References Cited

U.S. PATENT DOCUMENTS 4,672,654 A 6/1987 Vanacore
5,640,139 A 6/1997 Egeberg
(Continued)

FOREIGN PATENT DOCUMENTS

AU 2014236999 A1 10/2015
CA 2640261 A1 8/2007
(Continued)

OTHER PUBLICATIONS

Mobile Credential End-User Flyer, 3x Logic, Westminster, CO, 2 pages, 2018.
(Continued)

*Primary Examiner* — Nam V Nguyen
(74) *Attorney, Agent, or Firm* — Seager, Tufte & Wickhem, LLP

(57) ABSTRACT

A mobile device determines a current location based at least in part on one or more characteristics of one or more signals received from a wireless access point. The wireless access point receives from the mobile device the current location of the mobile device and an International Mobile Equipment Identity (IMEI)-based identifier that is unique to the user's mobile device. The door is electrically unlocked when the current location of the user's mobile device is determined to be within a predetermined proximity to the door and the wirelessly received IMEI based identifier of the user's mobile device is associated with a user that has access rights to access through the door.

20 Claims, 4 Drawing Sheets

(52) U.S. Cl.
CPC .............. *G07C 2009/00769* (2013.01); *G07C 2209/63* (2013.01)

(58) Field of Classification Search
CPC ........ G07C 9/28; H04W 4/023; H04W 8/205; H01Q 5/25
USPC ...................................................... 340/5.61
See application file for complete search history.

(56) References Cited

U.S. PATENT DOCUMENTS

| | | | |
|---|---|---|---|
| 5,723,911 A * | 3/1998 | Glehr | B60R 25/24 |
| | | | 340/426.36 |
| 6,384,709 B2 | 5/2002 | Mellen et al. | |
| 6,677,851 B1 * | 1/2004 | Losey | G07C 9/00309 |
| | | | 340/5.61 |
| 7,012,503 B2 | 3/2006 | Nielsen | |
| 7,969,302 B2 | 6/2011 | Srinivasa et al. | |
| 8,126,450 B2 * | 2/2012 | Howarter | B60R 25/241 |
| | | | 455/420 |
| 8,560,839 B2 | 10/2013 | Barham et al. | |
| 8,593,249 B2 | 11/2013 | Bliding et al. | |
| 8,725,112 B2 * | 5/2014 | De Atley | H04W 4/50 |
| | | | 455/425 |
| 8,792,936 B2 | 7/2014 | Rajendran et al. | |
| 8,793,776 B1 | 7/2014 | Jackson | |
| 8,839,361 B2 | 9/2014 | R | |
| 8,943,187 B1 | 1/2015 | Saylor | |
| 9,058,702 B2 | 6/2015 | Chao et al. | |
| 9,076,273 B2 | 7/2015 | Smith et al. | |
| 9,098,688 B1 | 8/2015 | Jackson | |
| 9,118,656 B2 | 8/2015 | Ting et al. | |
| 9,292,985 B2 | 3/2016 | Ahearn et al. | |
| 9,305,298 B2 | 4/2016 | Wilson | |
| 9,322,194 B2 | 4/2016 | Cheng et al. | |
| 9,322,201 B1 | 4/2016 | Cheng et al. | |
| 9,367,676 B2 | 6/2016 | Wilson | |
| 9,382,739 B1 | 7/2016 | Johnson et al. | |
| 9,396,320 B2 | 7/2016 | Lindemann | |
| 9,444,805 B1 | 9/2016 | Saylor et al. | |
| 9,470,017 B1 | 10/2016 | Cheng et al. | |
| 9,470,018 B1 | 10/2016 | Cheng et al. | |
| 9,472,034 B2 | 10/2016 | Ahearn et al. | |
| 9,508,206 B2 | 11/2016 | Ahearn et al. | |
| 9,514,469 B2 | 12/2016 | Fuchs et al. | |
| 9,530,295 B2 | 12/2016 | Johnson | |
| 9,589,403 B2 * | 3/2017 | Lingan | G07C 9/28 |
| 9,600,949 B2 | 3/2017 | Conrad et al. | |
| 9,713,002 B2 | 7/2017 | Roy et al. | |
| 9,767,632 B2 | 9/2017 | Johnson | |
| 9,887,983 B2 | 2/2018 | Lindemann et al. | |
| 10,096,182 B2 | 10/2018 | Prasad et al. | |
| 10,127,750 B2 * | 11/2018 | Cordiner | G07C 9/27 |
| 10,176,310 B2 | 1/2019 | Baghdasaryan | |
| 10,182,309 B2 | 1/2019 | Mahasenan et al. | |
| 10,186,098 B2 | 1/2019 | Lingan et al. | |
| 10,186,099 B2 | 1/2019 | Ahearn et al. | |
| 10,198,884 B2 | 2/2019 | Johnson | |
| 10,268,811 B2 | 4/2019 | Baghdasaryan | |
| 10,270,748 B2 | 4/2019 | Briceno et al. | |
| 10,304,273 B2 | 5/2019 | Johnson et al. | |
| 10,366,218 B2 | 7/2019 | Blanke | |
| 10,395,452 B2 * | 8/2019 | Morrison | G07C 9/20 |
| 10,438,428 B2 * | 10/2019 | Rettig | H04W 48/04 |
| 10,815,717 B2 * | 10/2020 | Kim | G01S 13/08 |
| 10,878,650 B1 | 12/2020 | Meruva et al. | |
| 11,348,396 B2 * | 5/2022 | Meruva | G07C 9/00309 |
| 11,361,605 B2 * | 6/2022 | Novozhenets | H04W 12/63 |
| 11,363,459 B2 | 6/2022 | Pazhyannur et al. | |
| 11,450,160 B2 * | 9/2022 | Koliparthi | G07C 9/00309 |
| 11,955,723 B2 * | 4/2024 | Pirch | H01Q 1/2216 |
| 12,238,091 B1 * | 2/2025 | Mars | H04L 63/083 |
| 2003/0179073 A1 | 9/2003 | Ghazarian | |
| 2005/0242957 A1 | 11/2005 | Lindsay et al. | |
| 2007/0186106 A1 | 8/2007 | Ting et al. | |

| | | | |
|---|---|---|---|
| 2009/0249433 A1 | 10/2009 | Misra et al. | |
| 2010/0102993 A1 | 4/2010 | Johnson | |
| 2010/0201536 A1 | 8/2010 | Robertson et al. | |
| 2011/0291798 A1 | 12/2011 | Schibuk | |
| 2012/0092127 A1 | 4/2012 | Ganapathi et al. | |
| 2012/0159156 A1 | 6/2012 | Barham et al. | |
| 2012/0169461 A1 * | 7/2012 | Dubois, Jr. | G07C 9/00309 |
| | | | 340/5.2 |
| 2012/0230489 A1 | 9/2012 | Cho | |
| 2012/0234058 A1 | 9/2012 | Neil et al. | |
| 2013/0021145 A1 | 1/2013 | Boudy | |
| 2013/0214898 A1 | 8/2013 | Pineau et al. | |
| 2013/0247117 A1 | 9/2013 | Yamada et al. | |
| 2013/0257589 A1 | 10/2013 | Mohiuddin et al. | |
| 2013/0268998 A1 | 10/2013 | Ko et al. | |
| 2013/0311373 A1 | 11/2013 | Han et al. | |
| 2013/0314210 A1 | 11/2013 | Schoner et al. | |
| 2013/0332367 A1 | 12/2013 | Quigley et al. | |
| 2014/0049361 A1 | 2/2014 | Ahearn et al. | |
| 2014/0084059 A1 | 3/2014 | Sierchio et al. | |
| 2014/0089178 A1 | 3/2014 | Lee et al. | |
| 2014/0159660 A1 | 6/2014 | Klose et al. | |
| 2014/0189880 A1 | 7/2014 | Funk et al. | |
| 2014/0277935 A1 | 9/2014 | Daman et al. | |
| 2014/0289116 A1 | 9/2014 | Polivanyi | |
| 2014/0289117 A1 | 9/2014 | Baghdasaryan | |
| 2014/0289790 A1 | 9/2014 | Wilson | |
| 2014/0289820 A1 | 9/2014 | Lindemann et al. | |
| 2014/0289833 A1 | 9/2014 | Briceno et al. | |
| 2014/0342667 A1 | 11/2014 | Aarnio | |
| 2014/0375421 A1 | 12/2014 | Morrison et al. | |
| 2015/0194000 A1 | 7/2015 | Schoenfelder et al. | |
| 2015/0227969 A1 | 8/2015 | Hanly | |
| 2016/0019734 A1 * | 1/2016 | Bauman | G07C 9/00309 |
| | | | 340/5.61 |
| 2016/0049025 A1 | 2/2016 | Johnson | |
| 2016/0189454 A1 | 6/2016 | Johnson et al. | |
| 2016/0319571 A1 | 11/2016 | Johnson | |
| 2016/0335819 A1 | 11/2016 | Lingan et al. | |
| 2016/0337508 A1 | 11/2016 | Roy et al. | |
| 2017/0018130 A1 | 1/2017 | Robinson | |
| 2017/0076523 A1 | 3/2017 | Rumble et al. | |
| 2017/0127372 A1 | 5/2017 | Patel et al. | |
| 2017/0154483 A1 | 6/2017 | Cordiner et al. | |
| 2017/0270732 A1 | 9/2017 | Troesch et al. | |
| 2017/0280322 A1 | 9/2017 | Roy et al. | |
| 2017/0289753 A1 | 10/2017 | Mahasenan et al. | |
| 2018/0068503 A1 | 3/2018 | Prasad et al. | |
| 2018/0068507 A1 | 3/2018 | Prasad et al. | |
| 2018/0144568 A1 | 5/2018 | Lingan et al. | |
| 2018/0234410 A1 | 8/2018 | Lindemann et al. | |
| 2018/0247038 A1 | 8/2018 | Lindemann | |
| 2018/0268675 A1 | 9/2018 | Johnson et al. | |
| 2019/0019364 A9 | 1/2019 | Cheng et al. | |
| 2019/0104133 A1 | 4/2019 | Markel et al. | |
| 2019/0130686 A1 | 5/2019 | Cheng et al. | |
| 2019/0130687 A1 | 5/2019 | Johnson | |
| 2019/0253404 A1 | 8/2019 | Briceno et al. | |
| 2019/0289463 A1 * | 9/2019 | Glouche | G06F 21/43 |
| 2020/0098216 A1 | 3/2020 | Kuster et al. | |
| 2020/0351661 A1 | 11/2020 | Kuenzi et al. | |
| 2020/0394856 A1 | 12/2020 | Meruva et al. | |
| 2022/0270424 A1 | 8/2022 | Meruva et al. | |
| 2022/0277605 A1 | 9/2022 | Coniff et al. | |
| 2022/0384949 A1 | 12/2022 | Pirch | |
| 2023/0417891 A1 * | 12/2023 | Land | G01S 13/0209 |
| 2024/0177554 A1 * | 5/2024 | Kincaid | G07C 9/28 |

FOREIGN PATENT DOCUMENTS

| | | |
|---|---|---|
| CA | 2654838 A1 | 8/2009 |
| CA | 2840665 A1 | 8/2014 |
| CA | 2905009 A1 | 9/2014 |
| CH | 699096 A2 | 1/2010 |
| CN | 102609662 B | 7/2012 |
| CN | 104144497 A | 11/2014 |
| CN | 206557866 U | 10/2017 |
| CN | 103685218 B | 9/2018 |
| CN | 103971039 B | 3/2020 |

(56)                References Cited

FOREIGN PATENT DOCUMENTS

| CN | 105229596 B | 4/2020 |
|---|---|---|
| CN | 112211502 A | 1/2021 |
| DE | 102014106364 A1 | 11/2014 |
| DE | 102014119003 A1 | 6/2016 |
| EP | 265270 A2 | 4/1988 |
| EP | 1982288 A2 | 10/2008 |
| EP | 2085934 A1 | 8/2009 |
| EP | 2106106 A1 | 9/2009 |
| EP | 2192560 A1 | 6/2010 |
| EP | 2709334 A2 | 3/2014 |
| EP | 2763106 A2 | 8/2014 |
| EP | 2976706 A2 | 1/2016 |
| EP | 3048587 A1 | 7/2016 |
| EP | 3496054 A1 | 6/2019 |
| ES | 2700361 T3 | 2/2019 |
| GB | 2608692 A | 1/2023 |
| IN | 2014CH00324 A | 4/2015 |
| JP | 2014503909 A | 2/2014 |
| JP | 6433978 B2 | 12/2018 |
| JP | 2019061688 A | 4/2019 |
| KR | 20060011267 A | 2/2006 |
| KR | 101889577 B1 | 8/2018 |
| TW | I513266 B | 12/2015 |
| WO | 2006136662 A1 | 12/2006 |
| WO | 2007089503 A2 | 8/2007 |
| WO | 2010003898 A1 | 1/2010 |
| WO | 201287853 A2 | 6/2012 |
| WO | 2014151692 A2 | 9/2014 |
| WO | 2014153462 A2 | 9/2014 |
| WO | 2023283484 A2 | 1/2023 |

OTHER PUBLICATIONS

Cappos et al; "BlurSense: Dynamic Fine-Grained Access Control for Smart Phone Privacy," 2014 IEEE Sensors Applications Symposium (SAS), 4 pages, 2014.

Kupper et al; "TraX: A Device-Centric Middleware Framework for Location Based Services," IEEE Communications Magazine, pp. 114-120, Sep. 2006.

Liu et al; "Double-Windows-Based Motion Recognition in Multi-Floor Buildings Assisted by a Built-in Barometer," Sensors, 2018, 18, 1061, pp. 1-23, Mar. 2018.

Location Based Tracker-Future Lab-ASSA ABLOY—Studying Security Trends. 2 pages, https: //futurelab.assaabloy.com/en/location-based-tracker/ accessed Mar. 1, 2021.

Shuster et al; "Situational Access Control in the Internet of Things," In 2018 SIGSAC Conference on Computer Communication Security (CCS' 18), Toronto, Ontario, Canada, 18 pages, Oct. 15-19, 2018.

Smart Keys, Locks and Door Openers as Part of Intelligent Access Control Systems, Conrad Connect, 2021. https://conradconnect.com/en/blog/smart-keys-locks-and-door-openers-part-intelligent-access-control-systems 16 pages, accessed Mar. 1, 2021.

Tarameshloo et al; "Access Control Models for Geo-Social Computing Systems," SACMAT' 14, London, Ontario, Canada, 12 pages, Jun. 25-27, 2014.

Zhang et al; "Location-Based Authentication and Authorization using Smart Phones," 2012 IEEE 11th International Conference on Trust, Security and Privacy in Computing and Communications, 8 pages, 2012.

Extended European Search Report, European Patent Office, EP Application No. 22156072.5, dated Jul. 21, 2022 (10 pages).

https://www.merriam-webster.com/dictionary/track 2 pages, accessed Apr. 7, 2017.

https://youtube/D1L3o88GKew, Lockitron—Keyless Entry Using Your Phone, Lockitron, 3 pages, Oct. 2, 2012. Accessed Mar. 19, 2018.

International Search Report for Corresponding Application No. EP14173062 dated Dec. 5, 2014.

MicroStrategy, "Secure Business Intelligence on Apple® Mobile Devices," Microstrategy Incorporated, 20 pages, COLL-09670511, 2011.

Khan et al., "Location Awareness in 5G Networks using RSS Measurements for Public Safety Applications," IEEE Access, vol. 5, pp. 21753-21762, 2017.

Qiu, "Study on Security and Privacy in 5G-Enabled Applications," Wireless Communications and Mobile Computing, vol. 2020, 15 pages, 2020.

Usher, "Safe and Secure Mobile Identity Network," Micro-Strategy Incorporated, 2 pages, COLL-1085 1012, 2013.

Wikipedia, International Mobile Equipment Identity, 7 pages, Accessed Aug. 24, 2023.

Fave et al., "Game-theoretic Security Patrolling with Dynamic Execution Uncertainty and a Case Study on a Real Transit System," Journal of Artificial Intelligence Research vol. 50, pp. 321-367, Jun. 2014.

"Logosoft brings lone worker supervision into the Android era," http://www.securitynewsdesk.com/lo go soft-brings-lone-worke**supervision-android-era/, 7 pages, May 29, 2014.

Sookman, "Smartphones are Key to the Future of Security," https://www.guardly.com/blog /2015 /0 2/04/smartphones-are-key-to-the•future-of-security/index.html, 5 pages, Feb. 4, 2015.

Bobescu et al., "Mobile indoor positioning using wi-fi localization," Review of the Air Force Academy, No. 1 (28), 4 pages, 2015.

Bhargava et al., "Physical Authentication through Localization in Wireless Local Area Networks," Global Telecommunications Co**ference, GLOBECOM '05 IEEE, 5 pages Jan. 23, 2006.

"Passive Entry Door System with Proximity Sensor," http://www.atmel.com/Images/ Atmel-425 82-Passive-Entry-Door-System-with•Proximity-Sensor_Application%20N ote _AT 12649. pdf, 22 pages, Nov. 2015.

Bellido-Outeirno, "Universal Bluetooth Access Control and Sec••rity System," International Journal on Advances in Security, vol. 4 No. 3 and 4, 10 pages, 2011.

"Mobile Access Control: the Ultimate Guide," KISI, 10 pages, accessed Jun. 17, 2019.

Extended European Search Report, EP Application No. 24195890.9, European Patent Office, Feb. 7, 2025 (9 pages).

* cited by examiner

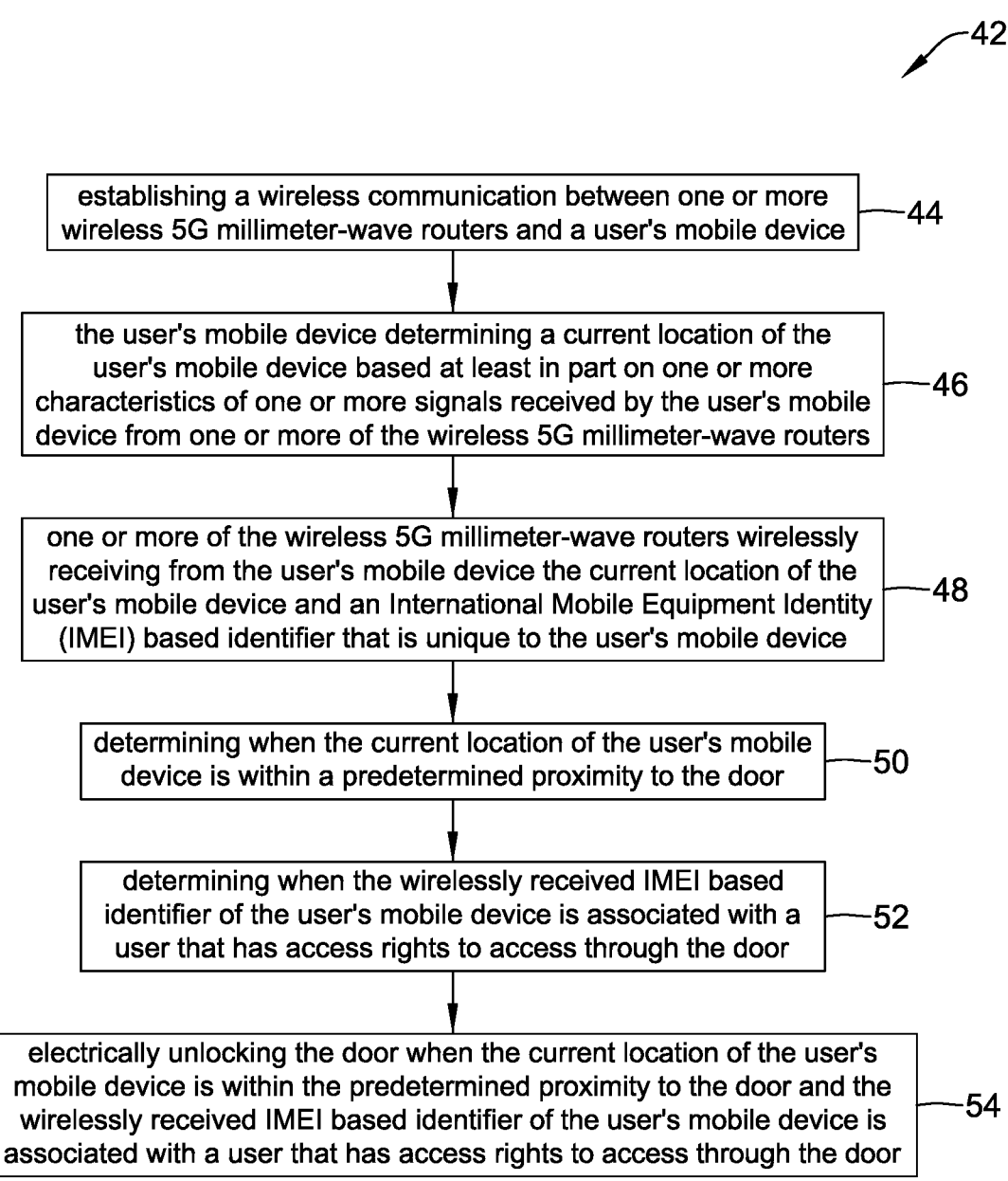

establishing a wireless communication between one or more wireless 5G millimeter-wave routers and a user's mobile device — 44 the user's mobile device determining a current location of the user's mobile device based at least in part on one or more characteristics of one or more signals received by the user's mobile device from one or more of the wireless 5G millimeter-wave routers — 46 one or more of the wireless 5G millimeter-wave routers wirelessly receiving from the user's mobile device the current location of the user's mobile device and an International Mobile Equipment Identity (IMEI) based identifier that is unique to the user's mobile device — 48 determining when the current location of the user's mobile device is within a predetermined proximity to the door — 50 determining when the wirelessly received IMEI based identifier of the user's mobile device is associated with a user that has access rights to access through the door — 52 electrically unlocking the door when the current location of the user's mobile device is within the predetermined proximity to the door and the wirelessly received IMEI based identifier of the user's mobile device is associated with a user that has access rights to access through the door — 54

FIG. 3

BUILDING ACCESS USING A MOBILE DEVICE

TECHNICAL FIELD

The present disclosure pertains generally to methods of gaining access to a controlled space and more particularly to methods of using mobile devices in gaining access to a controlled space.

BACKGROUND

Physical access control systems are designed to provide access to buildings and/or specific areas of a building for individuals who are authorized to access such areas and to deny access to buildings and/or specific areas of the building to individuals who are not authorized to access such areas. For example, certain individuals may be authorized to access a secure area of a building, whereas other individuals may not be allowed to access the secure area. In another example, certain individuals may be authorized to access a first building but not a second building, whereas other individuals may not be allowed to access either building. In some cases, access may be granted only during certain times.

Current approaches to physical access control systems often rely on users (e.g., employees) carrying physical access cards (e.g., physical badge) to gain entry to areas of a building. For example, a user can swipe a physical access card in an access card reader at a security door to gain entry to an area of a building. However, issuing and managing physical access card can be time consuming, cumbersome and error prone. What would be desirable is a system which allows a user's mobile device to act as an access credential for building access systems.

SUMMARY

This disclosure is directed to providing and/or managing access control, and more particularly to methods and systems for using a user's mobile device as an access credential to gain access to one or more authorized areas. An example may be found in a method of controlling access through a door of a facility having a door lock that can be electrically locked and unlocked. The illustrative method includes establishing a wireless communication between one or more wireless access points and a user's mobile device. The user's mobile device determining a current location of the user's mobile device based at least in part on one or more characteristics of one or more signals received by the user's mobile device from one or more of the wireless access points. One or more of the wireless access points wirelessly receives from the user's mobile device the current location of the user's mobile device and an International Mobile Equipment Identity (IMEI) based identifier that is unique to the user's mobile device. The IMEI based identifier may operate as a user credential. A determination is made as to when the current location of the user's mobile device is within a predetermined proximity to the door. A determination is made as to when the wirelessly received IMEI based identifier of the user's mobile device is associated with a user that has access rights to access through the door. The door is electrically unlocked when the current location of the user's mobile device is within the predetermined proximity to the door and the wirelessly received IMEI based identifier of the user's mobile device is associated with a user that has access rights to access through the door.

Another example may be found in an access control system for controlling access through a door of a facility. The illustrative access control system includes one or more wireless access points, a user's mobile device, and a door lock for locking and unlocking the door of the facility. The user's mobile device is configured to establish wireless communication with one or more of the wireless access points and to determine a current location of the user's mobile device based at least in part on one or more characteristics of one or more signals received by the user's mobile device from one or more of the wireless access points. The user's mobile device is configured to wirelessly send the determined current location of the user's mobile device and to wirelessly send an IMEI based identifier that is unique to the user's mobile device. One of the wireless access points is configured to wirelessly receive from the user's mobile device the current location of the user's mobile device and the IMEI based identifier that is unique to the user's mobile device. An access controller is operatively coupled to the one of the wireless access points and is configured to receive the current location of the user's mobile device and the IMEI based identifier that is unique to the user's mobile device. The access controller is configured to determine when the current location of the user's mobile device is within a predetermined proximity to the door, determine when the IMEI based identifier of the user's mobile device is associated with a user that has access rights to access through the door, and unlock the door via the door lock when the current location of the user's mobile device is within the predetermined proximity to the door and the IMEI based identifier of the user's mobile device is associated with a user that has access rights to access through the door.

Another example may be found in a method of controlling access through a door of a facility having a door lock that can be electrically locked and unlocked. The illustrative method includes establishing a wireless communication between one or more wireless 5G millimeter-wave routers and a user's mobile device. The user's mobile device determines a current location of the user's mobile device based at least in part on one or more characteristics of one or more signals received by the user's mobile device from one or more of the wireless 5G millimeter-wave routers. One or more of the wireless 5G millimeter-wave routers wirelessly receive from the user's mobile device the current location of the user's mobile device and an IMEI based identifier that is unique to the user's mobile device. The method includes determining when the current location of the user's mobile device is within a predetermined proximity to the door and determining when the wirelessly received IMEI based identifier of the user's mobile device is associated with a user that has access rights to access through the door. The door is electrically unlocked when the current location of the user's mobile device is within the predetermined proximity to the door and the wirelessly received IMEI based identifier of the user's mobile device is associated with a user that has access rights to access through the door.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 3 is a flow diagram showing an illustrative method of controlling access through a door of a facility having an electronically controlled door lock.

Figure 1:
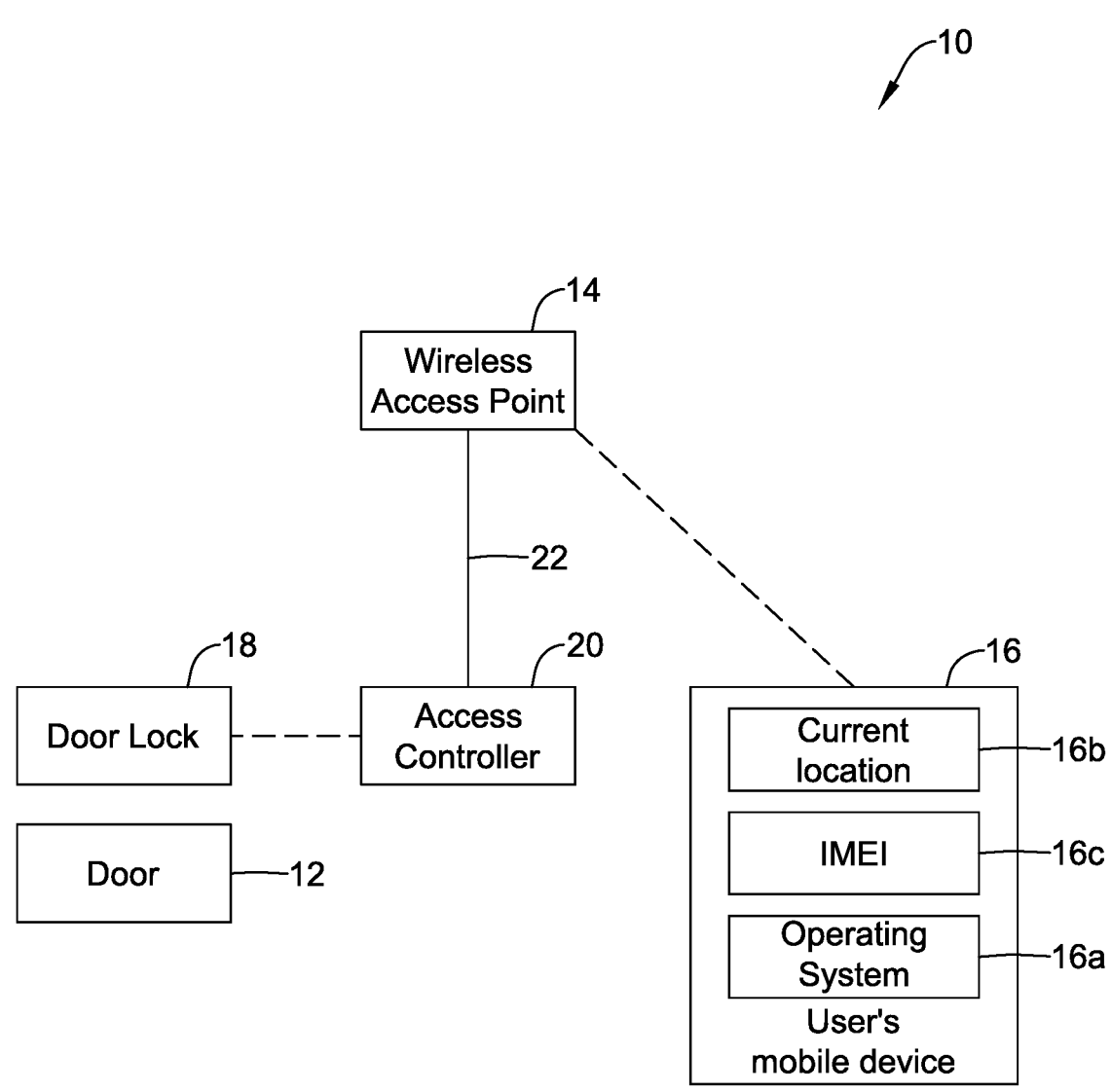
FIG. 1 is a schematic block diagram showing an illustrative access control system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings in which similar elements in different drawings are numbered the same. The drawings show by way of illustration how one or more embodiments of the disclosure may be practiced. The illustrative embodiments depicted are intended only as exemplary. Selected features of any illustrative embodiment may be incorporated into an additional embodiment unless clearly stated to the contrary.

User interaction with a door access control system can be streamlined using capabilities offered by mobile devices. For example, in some embodiments, a location service of a mobile device may determine a current location of the mobile device. The location service may use, for example, global positioning system (GPS) signals, cellular signals, Ultra-Wide-Band (UWB) signals, WiFi signals, Bluetooth signals, and/or other signals, to determine the currently location of the mobile device. In another example, a communication service of the mobile device may be used to communicate with one or more remote devices, and to pass information between the mobile device and one or more remote devices. Thus, in some cases, rather than physically presenting a card (or other device) to an access card reader to gain access to an area or facility, the user may simply move within a particular distance of a door and be automatically presented with an option to unlock the door. That is, rather than using "card readers", embodiments of the present disclosure allow a user's mobile device to perform the function of an access card, sometimes without requiring the download of a corresponding application from an application store. It is contemplated that embodiments of the present disclosure may be utilized with a variety of access systems. In some cases, embodiments of the present disclosure may be used with or in place of systems with door access card readers (those with and/or without Bluetooth® capabilities). Alternatively, or additionally, embodiments of the present disclosure may be used with systems that only include an actuatable lock mechanism (e.g., no card readers present).

The present disclosure is generally directed towards methods and systems for allowing secure access to one or more access points (e.g. door, gate, corridor, etc.) using a mobile device. It is contemplated that the system may allow a user to access two different buildings having two different access control providers using the same mobile device. In some cases, the buildings may belong to the same entity (e.g., company and/or corporation) or the buildings may belong to different entities. Generally, access points may be tagged with a geographic location (e.g., latitude, longitude, and/or altitude) and a door name. These access points may be selectively made available to users via the user's mobile device. Actuation of an unlock button on the mobile device may result in the unlocking of the door. In some cases, the door may unlock automatically when the mobile device is in proximity to the door, and in some cases the mobile device is moved in a predetermined way adjacent the door (i.e. turns toward the door), without requiring the user to activate an unlock button or the like via the user interface of the mobile device.

Embodiments of the present disclosure can reduce the need to issue a physical badge for every location or facility that a person (e.g., an employee, a contractor, a repair person, etc.) needs to access. In some cases, embodiments of the present disclosure can be retrofit to existing access control systems with and/or without smart reader systems without having to add additional hardware. Further, embodiments of the present disclosure may streamline or facilitate access requests for access to facilities and/or locations.

FIG. 1 is a schematic block diagram showing an illustrative access control system 10 for controlling access through a door 12 of a facility. The illustrative access control system 10 includes one or more wireless access points 14 (only one is shown), a user's mobile device 16 and a door lock 18 that is configured to lock and unlock the door 12 of the facility. In some instances, the door lock 18 is configured to be locked and unlocked electronically. In some instances, the one or more wireless access points 14 include a beacon. In some instances, the one or more wireless access points 14 include a wireless 5G millimeter-wave access point (e.g. wireless 5G millimeter-wave router or a 5G cellular tower) or a UWB access point (e.g. wireless UWB router).

The user's mobile device 16 includes an operating system 16a that is configured to determine a current location 16b of the user's mobile device 16, such as through a location service of the operating system 16a. The user's mobile device 16 includes an IMEI-based identifier 16c that is unique to the user's mobile device 16. In some instances, the IMEI-based identifier 16c is actually the IMEI number for that mobile device 16. In some cases, the IMEI-based identifier 16*c* may be derived from the IMEI number of the mobile device. For example, in some cases, the IMEI number of the user's mobile device may be hashed with a sim card serial number of the user's mobile device to derive the IMEI-based identifier 16*c*. In some cases, the hashed value may be encrypted to derive the IMEI-based identifier 16*c*. These are just examples. In any event, the IMEI-based identifier 16*c* operates as a user credential for the access control system. In some instances, the operating system 16*a* of the user's mobile device 16 may be configured to wirelessly send the determined current location 16*b* of the user's mobile device 16 and the IMEI-based identifier 16*c* that is unique to the user's mobile device 16 without first being prompted by an application program running on the user's mobile device 16.

In some instances, the operating system 16*a* of the user's mobile device 16 may only transmit the current location of the user's mobile device 16 and the IMEI-based identifier 16*c* when the user is currently signed in to the mobile device 16, or after the user has unlocked the mobile device 16. Unlocking the user's mobile device 16 may entail entering a pin, or using bio-information such as face recognition or a thumbprint, for example. In some instances, the user may be required to unlock their mobile device 16 each time the user desires entry through a locked door. In some instances, the operating system 16*a* of the mobile device 16 may transmit the current location of the user's mobile device 16 and the IMEI-based identifier 16*c* regardless of whether the user's mobile device 16 has been signed into or otherwise unlocked.

In one, the user's mobile device 16 is configured to establish wireless communication with one or more of the wireless access points 14 and to determine a current location of the user's mobile device based at least in part on one or more characteristics of one or more signals received by the user's mobile device 16 from one or more of the wireless access points 14. The one or more signals received by the user's mobile device 16 from one or more of the wireless access points 14 may include, for example, cellular signals, Ultra-Wide-Band (UWB) signals, WiFi signals, Bluetooth signals, and/or other signals, to help in determining the current location of the user's mobile device. In some cases, a location service of the operating system 16*a* of the user's mobile device 16 may determine the current location of the user's mobile device.

The user's mobile device 16 is configured to wirelessly send the determined current location 16*b* of the user's mobile device 16 and to wirelessly send the IMEI-based identifier 16*c* that is unique to the user's mobile device 16. One of the wireless access points 14 is configured to wirelessly receive from the user's mobile device 16 the current location 16*b* of the user's mobile device 16 and the IMEI-based identifier 16*c* that is unique to the user's mobile device 16.

In the example shown, the access control system 10 includes an access controller 20 that is operatively coupled to the one of the wireless access points and is configured to wirelessly receive the current location 16*b* of the user's mobile device 16 and the IMEI-based identifier 16*c* that is unique to the user's mobile device 16. The access controller 20 is configured to determine when the current location 16*b* of the user's mobile device 16 is within a predetermined proximity to the door 12 and to determine when the IMEI-based identifier 16*c* of the user's mobile device 16 is associated with a user that has access rights to access through the door 12. The access controller 20 is configured to unlock the door 12 via the door lock 18 when the current location 16*b* of the user's mobile device 16 is within the predetermined proximity to the door 12 and the IMEI-based identifier of the user's mobile device 16 is associated with a user that has access rights to access through the door 12. In some instances, the access controller 20 may be operatively coupled to the one of the wireless access points 14 that are configured to wirelessly receive the current location 16*b* of the user's mobile device 16 and the IMEI-based identifier 16*c* that is unique to the user's mobile device 16 via a network 22 (wired and/or wireless network).

Figure 2:
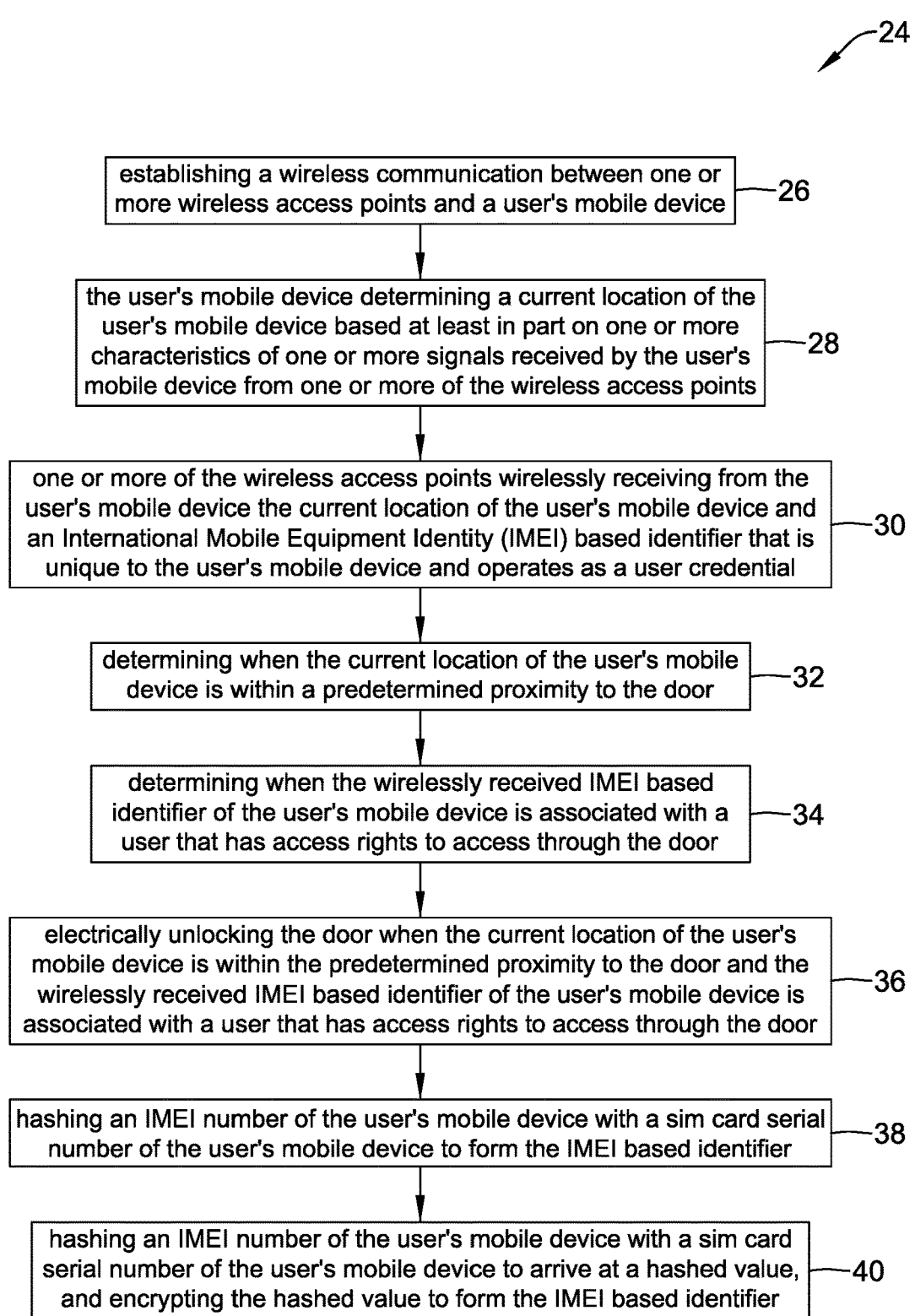
FIG. 2 is a flow diagram showing an illustrative method of controlling access through a door of a facility having an electronically controlled door lock.

FIG. 2 is a flow diagram showing an illustrative method 24 of controlling access through an access point (such as door 12) of a facility having a door lock (such as the door lock 18) that can be electrically locked and unlocked. The illustrative method 24 includes establishing a wireless communication between one or more wireless access points and a user's mobile device, as indicated at block 26. In some instances, the one or more wireless access points include a 5G millimeter-wave access point, and the wireless communication includes sending and receiving one or more 5G millimeter-wave signals. In some instances, the one or more wireless access points include an Ultra-Wide Band (UWB) access point, and the wireless communication includes sending and receiving one or more UWB signals. In some instances, the one or more of the wireless access points may include at least one wireless 5G millimeter-wave router. In some instances, the one or more of the wireless access points may include at least one wireless 5G cellular tower.

The user's mobile device determines a current location of the user's mobile device based at least in part on one or more characteristics of one or more signals received by the user's mobile device from one or more of the wireless access points, as indicated at block 28. In some instances, the user's mobile device determines the current location of the user's mobile device based at least in part on one or more characteristics of one or more of the 5G millimeter-wave signals received by the user's mobile device from one or more of the wireless access points. In some instances, the user's mobile device determines the current location of the user's mobile device based at least in part on one or more characteristics of one or more of the UWB signals received by the user's mobile device from one or more of the wireless access points. In some instances, the user's mobile device determines the current location of the user's mobile device based at least in part on one or more characteristics of one or more of the Bluetooth or Wifi signals received by the user's mobile device from one or more of the wireless access points (e.g. beacons).

One or more of the wireless access points then wirelessly receives from the user's mobile device the current location of the user's mobile device and an IMEI-based identifier that is unique to the user's mobile device, as indicated at block 30. The IMEI-based identifier operates as a user credential. In some instances, the user's mobile device includes an operating system that sends the current location of the user's mobile device and the IMEI based identifier to one or more of the wireless access points without first being prompted by an application program running on the user's mobile device (e.g. without requiring the download of a corresponding application to the user's mobile device from an application store).

The illustrative method 24 includes determining when the current location of the user's mobile device is within a predetermined proximity to the door, as indicated at block 32. The method 24 includes determining when the wirelessly received IMEI based identifier of the user's mobile device is associated with a user that has access rights to access through the door, as indicated at block 34. The door is electrically unlocked when the current location of the user's mobile device is within the predetermined proximity to the door and the wirelessly received IMEI based identifier of the user's mobile device is associated with a user that has access rights to access through the door, as indicated at block 36. In some instances, electrically unlocking the door may include sending an unlock signal from one of the one or more wireless access points to the door lock. In some instances, when one or more of the wireless access points includes a router that is in communication with a network of the facility, electrically unlocking the door may include sending via the router the unlock signal from one of the one or more wireless access points that include a router to the door lock across at least part of the network of the facility.

In some instances, one or more of the wireless access points include a router, and wherein one of the wireless access points that include the router may send via the router one or more of the current location of the user's mobile device and the IMEI based identifier of the user's mobile device to an access controller (such as access controller 20). The access controller may determine one or more of when the current location of the user's mobile device is within the predetermined proximity to the door and when the wirelessly received IMEI based identifier of the user's mobile device is associated with a user that has access rights to access through the door. In some instances, electrically unlocking the door includes having the access controller send an unlock signal from the access controller to the door lock.

In some instances, the method 24 includes hashing an IMEI number of the user's mobile device with a sim card serial number of the user's mobile device to form the IMEI based identifier, as indicated at block 38. In some instances, the method 24 may include hashing the IMEI number of the user's mobile device with a sim card serial number of the user's mobile device to arrive at a hashed value, and then encrypting the hashed value to form the IMEI based identifier, as indicated at block 40. These are just examples.

FIG. 3 is a flow diagram showing an illustrative method 42 of controlling access through an access point (such as the door 12) of a facility having a door lock (such as the door lock 18) that can be electrically locked and unlocked. The illustrative method 42 includes establishing a wireless communication between one or more wireless 5G millimeter-wave routers and a user's mobile device, as indicated at block 44. The user's mobile device determines a current location of the user's mobile device based at least in part on one or more characteristics of one or more signals received by the user's mobile device from one or more of the wireless 5G millimeter-wave routers, as indicated at block 46.

One or more of the wireless 5G millimeter-wave routers wirelessly receives from the user's mobile device the current location of the user's mobile device, and an IMEI-based identifier that is unique to the user's mobile device, as indicated at block 48. In some instances, an operating system running on the user's mobile device will send the current location of the user's mobile device and the IMEI-based identifier to one or more of the wireless 5G millimeter-wave routers without first being prompted by an application program running on the user's mobile device. A determination is made as to when the current location of the user's mobile device is within a predetermined proximity to the door, as indicated at block 50. In some instances, determining when the current location of the user's mobile device is within a predetermined proximity to the door includes determining when the current location of the user's mobile device remains within the predetermined proximity to the door for at least a threshold period of time. In some instances, determining when the current location of the user's mobile device is within a predetermined proximity to the door includes determining when the current location of the user's mobile device remains within the predetermined proximity to the door for at least a threshold period of time and the user's mobile device is moved in a predetermined way adjacent the door (i.e. turns toward the door and/or makes some other predetermined gesture adjacent the door).

A determination is also made as to when the wirelessly received IMEI based identifier of the user's mobile device is associated with a user that has access rights to access through the door, as indicated at block 52. The door is electrically unlocked when the current location of the user's mobile device is within the predetermined proximity to the door and the wirelessly received IMEI-based identifier of the user's mobile device is associated with a user that has access rights to access through the door, as indicated at block 54.

Figure 4:
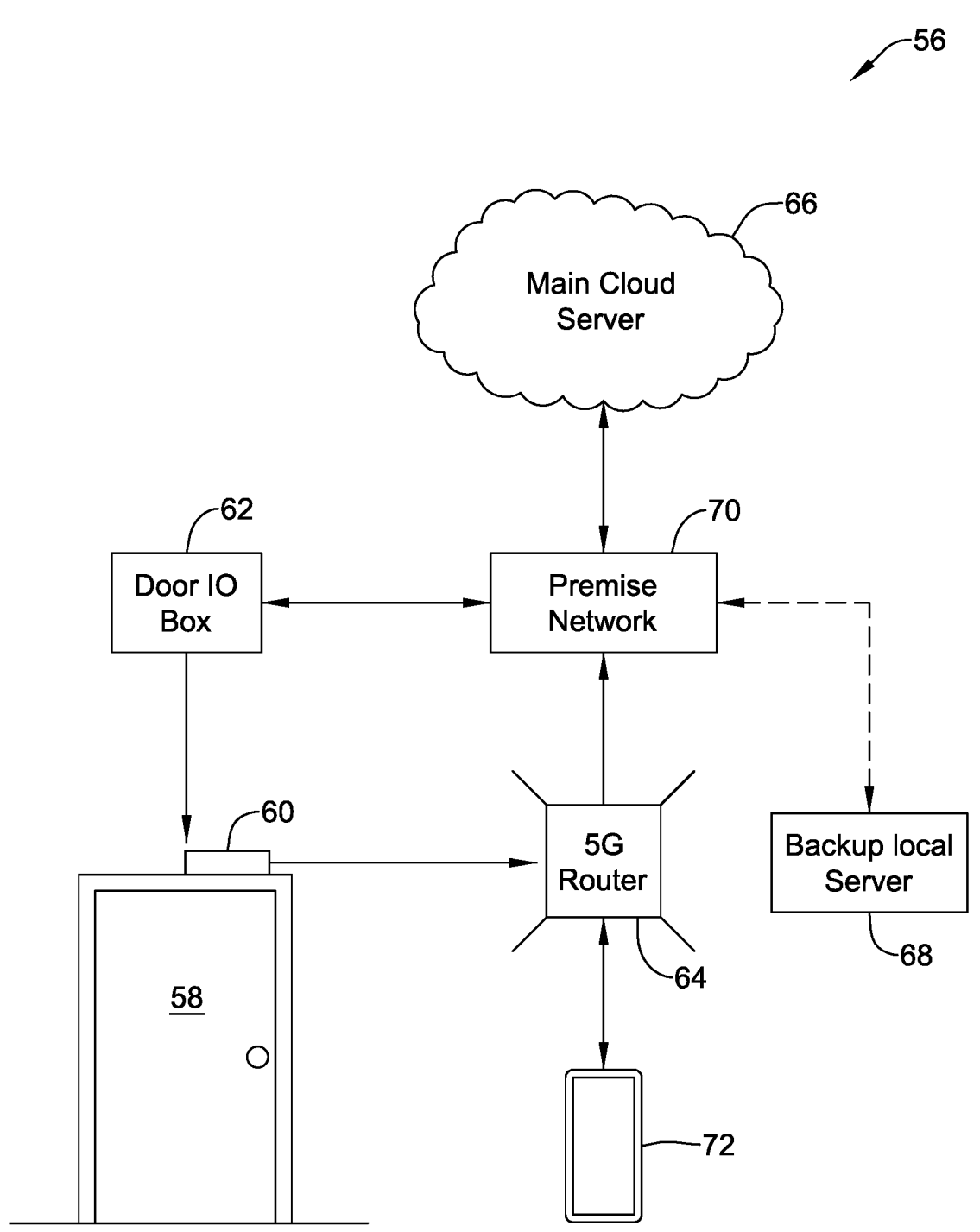
FIG. 4 is a schematic block diagram showing an illustrative access control system.

FIG. 4 is a schematic block diagram showing an illustrative access control system 56. The illustrative access control system 56 may be considered as being an example of the access control system 10. A door 58 includes a door lock 60. In some instances, the door lock 60 may be configured to communicate via UWB, 5G, Wifi, Bluetooth or any other suitable wireless protocol. The illustrative access control system 56 includes a door IO box 62, a wireless 5G millimeter-wave router 64, a main cloud server 66 and a backup local server 68. Each of the door IO box 62, the wireless 5G millimeter-wave router 64, the main cloud server 66 and the backup local server 68 each communicate via a network 70. In the example shown, the door IO box 62 provides a wired or wireless connection between the door lock 60 and the network 70. A user is holding a mobile device 72. In some instances, the mobile device 72 determines its location, and thus its position relative to the door 58, and communicates its location to the wireless 5G millimeter-wave router 64. The information is shared with the main cloud server 66 via the network 70. Assuming the user with the mobile device 72 is close enough to the door 58 (e.g. is in a predetermined proximity to the door 58), and is authorized to gain access through the door 58, the main cloud server 66 will instruct the door lock 60 to unlock the door 58.

In some instances, the door lock 60 may be wireless. In this case, the IO box 62 is not included. Instead, the mobile device 72 communicates with the wireless 5G millimeter-wave router 64, which then communicates directly with the door lock 60. In some instances, the wireless 5G millimeter-wave router 64 may itself track the distance between the user's mobile device 72 and the door 58, and may itself decide when to grant access through the door 58. If the door lock 60 is wireless and the wireless 5G millimeter-wave router 64 is down, the mobile device 72 may be able to communicate directly with the door lock 60 and unlock the door 58 when appropriate. In some instances, if the main cloud server 66 fails, the backup local server 68 will be engaged. In some instances, when the door lock 60 is wired, and if the wireless 5G millimeter-wave router 64 fails, the user's mobile device 72 may communicate directly with the door lock 60, which will share details via the door IO box 62 with the network 70 and thus with the main cloud server 66. These are just examples.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of controlling access through a door of a facility having a door lock that can be electrically locked and unlocked, the method comprising:

establishing a wireless communication between one or more wireless access points and a user's mobile device;

the user's mobile device determining a current location of the user's mobile device;

one or more of the wireless access points wirelessly receiving from the user's mobile device the current location of the user's mobile device and an International Mobile Equipment Identity (IMEI)-based identifier that is unique to the user's mobile device and operates as a user credential;

determining when the current location of the user's mobile device remains within a predetermined proximity to the door for at least a threshold period of time;

determining when the wirelessly received IMEI-based identifier of the user's mobile device is associated with a user that has access rights to access through the door;

electrically unlocking the door when each of:

the current location of the user's mobile device remains within the predetermined proximity to the door for at least the threshold period of time;

the user's mobile device detects a user action indicating an intent to open the door; and the wirelessly received IMEI-based identifier of the user's mobile device is associated with a user that has access rights to access through the door.

2. The method of claim 1, wherein:

wherein the one or more wireless access points (14) include a 5G millimeter-wave access point, and the wireless communication includes sending and receiving one or more 5G millimeter-wave signals; and the user's mobile device determining the current location of the user's mobile device based at least in part on one or more characteristics of one or more of the 5G millimeter-wave signals received by the user's mobile device from one or more of the wireless access points.

3. The method of claim 1, wherein the one or more wireless access points include an Ultra-Wide Band (UWB) access point, and the wireless communication includes sending and receiving one or more UWB signals.

4. The method of claim 3, wherein:

the user's mobile device determining the current location of the user's mobile device based at least in part on one or more characteristics of one or more of the UWB signals received by the user's mobile device from one or more of the wireless access points.

5. The method of claim 1, wherein electrically unlocking the door includes sending an unlock signal from one of the one or more wireless access points to the door lock.

6. The method of claim 5, wherein one or more of the wireless access points includes a router that is in communication with a network of the facility, wherein electrically unlocking the door includes sending via the router the unlock signal from one of the one or more wireless access points that include the router to the door lock across at least part of the network of the facility.

7. The method of claim 1, wherein one or more of the wireless access points include a router, and wherein one of the wireless access points that include the router sending via the router one or more of the current location of the user's mobile device and the IMEI-based identifier of the user's mobile device to an access controller, the access controller determining one or more of:

when the current location of the user's mobile device remains within the predetermined proximity to the door for at least the threshold period of time;

when the wirelessly received IMEI-based identifier of the user's mobile device is associated with a user that has access rights to access through the door; and wherein electrically unlocking the door includes sending an unlock signal from the access controller to the door lock.

8. The method of claim 1, further comprising hashing an IMEI number of the user's mobile device with a sim card serial number of the user's mobile device to form the IMEI based identifier.

9. The method of claim 1, further comprising hashing an IMEI number of the user's mobile device with a sim card serial number of the user's mobile device to arrive at a hashed value, and encrypting the hashed value to form the IMEI-based identifier.

10. The method of claim 1, wherein the user's mobile device includes on Operating System (OS), the OS sending the current location of the user's mobile device and the IMEI-based identifier to one or more of the wireless access points without first being prompted by an application program running on the user's mobile device.

11. The method of claim 1, wherein the user action is an actuation of an unlock button on the mobile device.

12. The method of claim 1, wherein the user action is a movement of the mobile device toward the door without the user activating an unlock button on the mobile device.

13. An access control system for controlling access through a door of a facility, the access control system comprising:

one or more wireless access points;

a user's mobile device;

a door lock for locking and unlocking the door of the facility;

the user's mobile device is configured to:

establish wireless communication with one or more of the wireless access points;

determine a current location of the user's mobile device;

wirelessly send the determined current location of the user's mobile device;

wirelessly send an International Mobile Equipment Identity (IMEI)-based identifier that is unique to the user's mobile device;

one of the wireless access points is configured to:

wirelessly receive from the user's mobile device the current location of the user's mobile device and the International Mobile Equipment Identity (IMEI)-based identifier that is unique to the user's mobile device;

an access controller operatively coupled to the one of the wireless access points that is configured to wirelessly receive the current location of the user's mobile device and the International Mobile Equipment Identity (IMEI)-based identifier that is unique to the user's mobile device, the access controller configured to:

determine when the current location of the user's mobile device remains within a predetermined proximity to the door for at least a threshold period of time;

determine when the IMEI-based identifier of the user's mobile device is associated with a user that has access rights to access through the door; and unlock the door via the door lock when the current location of the user's mobile device remains within the predetermined proximity to the door for at least the threshold period of time, the user's mobile device detects a user action indicating an intent to open the door, and the IMEI-based identifier of the user's mobile device is associated with a user that has access rights to access through the door.

14. The access control system of claim 13, wherein the access controller is operatively coupled to the one of the wireless access points that is configured to wirelessly receive the current location of the user's mobile device and the International Mobile Equipment Identity (IMEI)-based identifier that is unique to the user's mobile device via a network.

15. The access control system of claim 13, wherein the user's mobile device includes on Operating System (OS), the OS is configured to wirelessly send the determined current location of the user's mobile device and the International Mobile Equipment Identity (IMEI)-based identifier that is unique to the user's mobile device without first being prompted by an application program running on the user's mobile device.

16. The access control system of claim 13, wherein the user action is an actuation of an unlock button on the mobile device.

17. The access control system of claim 13, wherein the user action is a movement of the mobile device toward the door without the user activating an unlock button on the mobile device.

18. A method of controlling access through a door of a facility having a door lock that can be electrically locked and unlocked, the method comprising:

establishing a wireless communication between one or more wireless 5G millimeter-wave routers and a user's mobile device;

the user's mobile device determining a current location of the user's mobile device based at least in part on one or more characteristics of one or more signals received by the user's mobile device from one or more of the wireless 5G millimeter-wave routers;

one or more of the wireless 5G millimeter-wave routers wirelessly receiving from the user's mobile device the current location of the user's mobile device and an International Mobile Equipment Identity (IMEI)-based identifier that is unique to the user's mobile device;

determining when the current location of the user's mobile device remains within a predetermined proximity to the door for at least a threshold period of time;

determining when the wirelessly received IMEI-based identifier of the user's mobile device is associated with a user that has access rights to access through the door; and electrically unlocking the door when:

the current location of the user's mobile device remains within the predetermined proximity to the door for at least the threshold period of time;

the user's mobile device detects a user action indicating an intent to open the door; and the wirelessly received IMEI-based identifier of the user's mobile device is associated with a user that has access rights to access through the door.

19. The method of claim 18, wherein the user action is an actuation of an unlock button on the mobile device.

20. The method of claim 18, wherein the user action is a movement of the mobile device toward the door without the user activating an unlock button on the mobile device.

*     *     *     *     *